(12) United States Patent
Flath et al.

(10) Patent No.: US 10,414,863 B2
(45) Date of Patent: Sep. 17, 2019

(54) POLYMERIC MATERIALS

(71) Applicant: VICTREX MANUFACTURING LIMITED, Lancashire (GB)

(72) Inventors: Dianne Flath, Lancashire (GB); Alice Matthews, Lancashire (GB); Craig Meakin, Lancashire (GB); Michael Toft, Lancashire (GB)

(73) Assignee: VICTREX MANUFACTURING LIMITED, Lancashire (GB)

( * ) Notice: Subject to any disclaimer, the term of this patent is extended or adjusted under 35 U.S.C. 154(b) by 0 days.

(21) Appl. No.: 15/537,276

(22) PCT Filed: Dec. 18, 2015

(86) PCT No.: PCT/GB2015/054067
§ 371 (c)(1),
(2) Date: Jun. 16, 2017

(87) PCT Pub. No.: WO2016/097752
PCT Pub. Date: Jun. 23, 2016

(65) Prior Publication Data
US 2017/0355819 A1 Dec. 14, 2017

(30) Foreign Application Priority Data

Dec. 18, 2014 (GB) .................................. 1422550.2
Jul. 24, 2015 (GB) .................................. 1513136.0

(51) Int. Cl.
C08G 65/40 (2006.01)
C08L 71/00 (2006.01)
C08L 83/04 (2006.01)
C08L 33/12 (2006.01)

(52) U.S. Cl.
CPC .......... *C08G 65/4012* (2013.01); *C08L 33/12* (2013.01); *C08L 71/00* (2013.01); *C08L 83/04* (2013.01); *C08G 2650/40* (2013.01)

(58) Field of Classification Search
CPC ............................... C08L 71/08; C08L 61/18
See application file for complete search history.

(56) References Cited

U.S. PATENT DOCUMENTS

| 4,717,761 | A | * | 1/1988 | Staniland | ........... | C08G 65/4093 |
| | | | | | | 528/125 |
| 4,804,724 | A | | 2/1989 | Harris et al. | | |
| 4,942,216 | A | | 7/1990 | Heinz et al. | | |
| 4,975,470 | A | | 12/1990 | Matzner et al. | | |
| 5,143,986 | A | * | 9/1992 | Reuter | ............... | C08G 65/4012 |
| | | | | | | 525/132 |
| 5,475,053 | A | * | 12/1995 | Niessner | ................. | C08L 51/04 |
| | | | | | | 525/279 |
| 6,361,724 | B1 | * | 3/2002 | Maeda | .................... | B29C 47/76 |
| | | | | | | 264/141 |
| 6,746,757 | B1 | * | 6/2004 | Takagi | .................... | B32B 27/08 |
| | | | | | | 428/213 |
| 7,754,813 | B2 | * | 7/2010 | Murakami | ................ | C08F 8/30 |
| | | | | | | 525/191 |
| 2006/0205872 | A1 | * | 9/2006 | Elkovitch | ............... | B82Y 30/00 |
| | | | | | | 525/66 |
| 2007/0197739 | A1 | * | 8/2007 | Aneja | ...................... | C08L 71/10 |
| | | | | | | 525/437 |
| 2008/0096693 | A1 | * | 4/2008 | Boehm | .............. | A63B 37/0003 |
| | | | | | | 473/374 |
| 2008/0274360 | A1 | | 11/2008 | Gallucci | | |
| 2011/0212290 | A1 | | 9/2011 | Crawley et al. | | |
| 2013/0116382 | A1 | * | 5/2013 | Kisin | .................... | C08L 51/003 |
| | | | | | | 525/133 |
| 2013/0261237 | A1 | * | 10/2013 | Qiu | ......................... | C08L 53/02 |
| | | | | | | 524/210 |

(Continued)

FOREIGN PATENT DOCUMENTS

| EP | 1 884 538 A1 | 2/2008 |
| EP | 2 738 219 A1 | 6/2014 |

(Continued)

OTHER PUBLICATIONS

Machine Translation of JP-62151452-A, 2019 (Year: 2019).*
Dow Technical data sheet (Paraloid EXL 2314 Impact Modifier, 2010) (Year: 2010).*
International Search Report (PCT/ISA/210) dated May 7, 2016, by the European Patent Office as the International Searching Authority for International Application No. PCT/GB2015/054067.

(Continued)

*Primary Examiner* — Liam J Heincer
(74) *Attorney, Agent, or Firm* — Buchanan, Ingersoll & Rooney PC

(57) ABSTRACT

A composition comprising:
(i) a polymeric material (A) having a repeat unit of formula —(O-Ph)n-O-Ph-O-Ph-CO-Ph-    I and a repeat unit of formula —O-Ph-Ph-O-Ph-CO-Ph-    II wherein Ph represents a phenylene moiety and n represents 0 or 1; and
(ii) a polymeric additive comprising one or more of:
(a) a polycarbonate; and/or
(b) a polymeric material (B) which includes a repeat unit of general formula

—(CR$^1$R$^2$—CR$^3$R$^4$)—    III wherein R$^1$ and R$^2$ independently represent a hydrogen atom or an optionally-substituted (preferably un-substituted) alkyl group, and R$^3$ and R$^4$ independently represent a hydrogen atom or an optionally-substituted alkyl group, an anhydride-containing moiety or an alkyloxycarbonyl-containing moiety.

15 Claims, No Drawings

(56) References Cited

U.S. PATENT DOCUMENTS

| | | | | |
|---|---|---|---|---|
| 2014/0066561 A1* | 3/2014 | Pfleghar | .................. | C08K 7/14 |
| | | | | 524/407 |
| 2014/0235787 A1 | 8/2014 | Capra et al. | | |
| 2014/0295995 A1* | 10/2014 | Sullivan | ............. | A63B 37/0063 |
| | | | | 473/373 |
| 2015/0175803 A1* | 6/2015 | Stoppelmann | ........... | C08K 3/22 |
| | | | | 428/35.7 |
| 2015/0259531 A1 | 9/2015 | El-Hibri et al. | | |
| 2018/0208740 A1* | 7/2018 | Matthews | .......... | C08G 65/4012 |

FOREIGN PATENT DOCUMENTS

| | | | | |
|---|---|---|---|---|
| GB | 2 495 624 A | 4/2013 | | |
| JP | 62151452 A | * | 7/1987 | .............. C08L 71/00 |
| WO | WO 2006/106352 A1 | 10/2006 | | |

OTHER PUBLICATIONS

Written Opinion (PCT/ISA/237) dated May 7, 2016, by the European Patent Office as the International Searching Authority for International Application No. PCT/GB2015/054067.

United Kingdom Search Report dated Jun. 17, 2015, issued in corresponding United Kingdom Patent Application No. GB1422550.2. (4 pages).

United Kingdom Search Report dated Jan. 26, 2016, issued in corresponding United Kingdom Patent Application No. GB1513136.0. (3 pages).

* cited by examiner

POLYMERIC MATERIALS

This invention relates to polymeric material and particularly, although not exclusively, relates to compositions comprising a polymeric material.

Polyetheretherketone (PEEK) is a very well-known, commercially available, high performance thermoplastic polymer. It has excellent mechanical properties. Furthermore, by virtue of its high crystallinity, it is highly chemically resistant. Consequently, it is widely used in challenging applications, for example in the oil industry and in aerospace.

For some applications, it is desirable to make very thin-walled (e.g. of thicknesses less than 3 mm or even less than 1 mm) parts from polymeric materials. To achieve this, the thermoplastic polymeric material used needs to be sufficiently mobile (e.g. have a high melt flow index (MFI)) at its melt processing temperature, to fill moulds which are arranged to define thin-walled parts.

The mobility of PEEK can be improved (i.e. its MFI increased) by producing a PEEK with a lower melt-viscosity (MV). However, reducing the MV of PEEK also leads to a gradual worsening of mechanical properties of the PEEK, until a minimum MV is reached wherein the polymer has poor mechanical properties and/or is brittle.

It is known to produce compositions comprising PEEK and additives intended to reduce the viscosity of the PEEK and thereby improve its flowability. However, compositions comprising additives may have reduced crystallinity compared to that of virgin PEEK. Consequently, such compositions may have reduced chemical resistance meaning they are unsuitable or less suitable for challenging applications. In addition, many additives for polymeric materials decompose or are otherwise detrimentally affected at the relatively high processing temperature of PEEK (PEEK has a melting temperature (Tm) of 343° C.) and as a result cannot be melt-compounded with PEEK in any event.

It is an object of preferred embodiments of the present invention to address the above described problems.

It is an object of preferred embodiments of the present invention to provide compositions which can be used to produce thin-walled parts which have excellent mechanical and chemical resistance properties.

According to a first aspect of the invention, there is provided a composition comprising:

(i) a polymeric material (A) having a repeat unit of formula

—(O-Ph)n-O-Ph-O-Ph-CO-Ph-  I and a repeat unit of formula

—O-Ph-Ph-Oh-CO-Ph-  II wherein Ph represents a phenylene moiety and n represents 0 or 1; and (ii) a polymeric additive, wherein said polymeric additive is selected from the group comprising:
(a) a polycarbonate; and
(b) a polymeric material (B) which includes a repeat unit of general formula

III

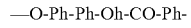

wherein $R^1$ and $R^2$ independently represent a hydrogen atom or an optionally-substituted (preferably un-substituted) alkyl group, and $R^3$ and $R^4$ independently represent a hydrogen atom or an optionally-substituted alkyl group, an anhydride-containing moiety or an alkyloxycarbonyl-containing moiety.

A composition as described is found, surprisingly, to have a significantly reduced melt viscosity compared to the melt viscosity of virgin polymeric material (A) whilst substantially maintaining the crystallinity and mechanical properties of polymeric material (A).

Said polymeric material (A) is preferably semi-crystalline. A skilled person can readily assess whether a polymer is semi-crystalline, for example, by wide angle X-ray diffraction (also referred to as Wide Angle X-ray Scattering or WAXS) or by Differential Scanning Calorimetry (DSC). A preferred method is described in Example 12.

In some embodiments preferably the composition comprises at least 60 wt % polymeric material (A), more preferably at least 70 wt % polymeric material (A), even more preferably at least 75 wt % polymeric material (A), even more preferably at least 78 wt % polymeric material (A), most preferably at least 80 wt % polymeric material (A). In some embodiments preferably the composition comprises at most 99 wt % polymeric material (A), more preferably at most 95 wt % polymeric material (A), more preferably at most 90 wt % polymeric material (A), even more preferably at most 85 wt % polymeric material (A), most preferably at most 80 wt % polymeric material (A). These preferred values enable further improvements in the mechanical properties of the composition.

In polymeric material (A), said repeat units I and II are preferably in the relative molar proportions I:II of from 85:35 to 95:5, more preferably from 70:30 to 85:15.

The phenylene moieties (Ph) in each repeat unit I and II may independently have 1,4-para linkages to atoms to which they are bonded or 1,3-meta linkages. Where a phenylene moiety includes 1,3-linkages, the moiety will be in the amorphous phase of the polymer. Crystalline phases will include phenylene moieties with 1,4-linkages. In many applications it is preferred for the polymeric material (A) to be highly crystalline and, accordingly, the polymeric material (A) preferably includes high levels of phenylene moieties with 1,4-linkages.

In a preferred embodiment, at least 95%, preferably at least 99%, of the number of phenylene moieties (Ph) in the repeat unit of formula I have 1,4-linkages to moieties to which they are bonded. It is especially preferred that each phenylene moiety in the repeat unit of formula I has 1,4-linkages to moieties to which it is bonded.

In a preferred embodiment, at least 95%, preferably at least 99%, of the number of phenylene moieties (Ph) in the repeat unit of formula II have 1,4-linkages to moieties to which they are bonded. It is especially preferred that each phenylene moiety in the repeat unit of formula II has 1,4-linkages to moieties to which it is bonded.

Preferably, the phenylene moieties in repeat unit of formula I are un-substituted. Preferably, the phenylene moieties in repeat unit of formula II are un-substituted.

Preferably, n=0 in said polymeric material (A).

Said repeat unit of formula I suitably has the structure

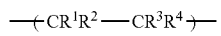

IV

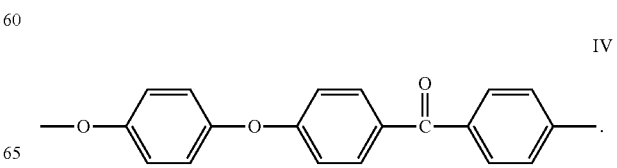

Said repeat unit of formula II suitably has the structure

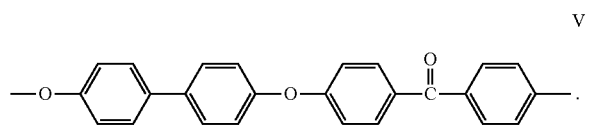

V

Said polymeric material (A) may include at least 88 mol %, preferably at least 71 mol %, of repeat units of formula IV. Particular advantageous polymers may include at least 72 mol %, or, especially, at least 74 mol % of repeat units of formula IV. Said polymeric material (A) may include less than 90 mol %, suitably 82 mol % or less of repeat units of formula IV. Said polymeric material (A) may include 68 to 82 mol %, preferably 70 to 80 mol %, more preferably 72 to 77 mol % of units of formula IV.

Said polymeric material (A) may include at least 10 mol %, preferably at least 18 mol %, of repeat units of formula V. Said polymeric material (A) may include less than 32 mol %, preferably less than 29 mol % of repeat units of formula V. Particularly advantageous polymers may include 28 mol % or less; or 26 mol % or less of repeat units of formula V. Said polymeric material (A) may include 18 to 32 mol %, preferably 20 to 30 mol %, more preferably 23 to 28 mol % of units of formula V.

The sum of the mol % of units of formula IV and V in said polymeric material (A) is suitably at least 95 mol %, is preferably at least 98 mol %, is more preferably at least 99 mol % and, especially, is about 100 mol %.

The ratio defined as the mol % of units of formula IV divided by the mol % of units of formula V may be in the range 1.8 to 5.6, is suitably in the range 2.3 to 4 and is preferably in the range 2.6 to 3.3.

The Tm of said polymeric material (A) may be less than 330° C. is suitably less than 320° C., is preferably less than 310° C. In some embodiments, the Tm may be less than 306° C. The Tm may be greater than 280° C., or greater than 290° C., 295° C. or 300° C. The Tm is preferably in the range 300° C. to 310° C. Tm may be measured as described in Example 12.

In a preferred embodiment, said polymeric material (A) has a Tg in the range 145° C. to 155° C., a Tm in the range 300'C to 310° C. and the difference between the Tm and Tg is in the range 145° C. to 165° C. Tg is suitably determined as described in Example 12.

Said polymeric material (A) may have a crystallinity measured as described in Example 12 of at least 23%. The crystallinity measured by WAXS (as described by Blundell and Osborn, supra) may also be at least 23%.

Said polymeric material (A) suitably has a melt viscosity (MV) (measured as described in Example 9 of at least 170 Pa·s, preferably has a MV of at least 180 Pa·s, more preferably at least 190 Pa·s, especially at least 200 Pa·s. The MV may be less than 350 Pa·s or less than 300 Pa·s.

Said polymeric additive is preferably not crystalline. Said polymeric additive is preferably amorphous.

Said polymeric additive may have a softening point (sometimes equated to a Tm although since the additives are not crystalline there is no sharp Tm) of at least 100° C., preferably at least 120° C. The softening point may be less than 200° C. Said polymeric additive is preferably a fluid (i.e. it flows) at a temperature of 200° C., for example at 170° C.

Said polymeric additive may have a decomposition temperature measured by thermogravimetric analysis (TGA) in accordance with ISO11358 or as described in 'Thermal analysis of polymers—fundamentals & applications. Editors Joseph D Menczel and R Bruce Prime, Wiley-Blackwell, 1$^{st}$ Edition 2009, of less than 400° C. for example less than 390° C. In cases where said polymeric additive is a polymeric material (B) as described in (ii)(b), said polymeric additive may have a decomposition temperature of less than 350° C. or even less than 330° C., The onset of decomposition may be less than 380° C. In cases where said polymeric additive is a polymeric material (B) as described in (ii)(b), said polymeric additive may show onset of decomposition at a temperature of less than 320° C. or even less than 300° C.

In some embodiments, preferably the composition comprises at least 0.5 wt % said polymeric additive, more preferably at least 1 wt % said polymeric additive, even more preferably at least 5 wt % said polymeric additive, even more preferably at least 10 wt % said polymeric additive, even more preferably at least 15 wt % said polymeric additive, most preferably at least 20 wt % said polymeric additive. Preferably the composition comprises at most 40 wt % said polymeric additive, more preferably at most 30 wt % said polymeric additive, even more preferably at most 25 wt % said polymeric additive, most preferably at most 20 wt % said polymeric additive. These preferred values enable further improvements in the lightness and mechanical properties of the composition.

Said polymeric material (A) and said polymeric additive are preferably substantially immiscible. The suitably exhibit at least two Tgs.

Said polymeric additive preferably does not include any chlorine atoms. Said polymeric additive preferably does not include any fluorine atoms. Said polymeric additive preferably does not include any halogen atoms.

Said polymeric additive preferably does not include any nitrogen atoms. It preferably does not include any sulphur atoms. It preferably does not include any silicon atoms.

Preferably, said polymeric additive includes carbon, hydrogen and oxygen atoms. Preferably, the only atoms included in said polymeric additive are carbon, hydrogen and oxygen atoms.

When said polymeric additive is a polycarbonate as described in (ii)(a), said polycarbonate is preferably a thermoplastic polymer. It is preferably aromatic. It preferably includes non-substituted phenyl moieties in its polymer backbone. It preferably includes non-substituted phenyl moieties linked to —O—C(O)— moieties (i.e. carbonate moieties) in the polymer backbone. It preferably includes diphenyl moieties in the polymer backbone. Such diphenyl moieties are preferably non-substituted.

Said polycarbonate is suitably derived from a dihydric phenol which is reacted with a carbonate precursor. Preferably, said polycarbonate is derived form 2,2-bis(4-hydroxyphenyl) propane (i.e. Bisphenol A). Said polycarbonate preferably includes a repeat unit of formula

VI

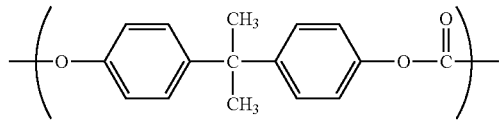

Suitably, said polycarbonate includes at least 50 wt %, preferably at least 75 wt %, more preferably at least 90 wt %, especially at least 95 wt % of repeat units of formula VI. Said polycarbonate preferably consists essentially of repeat units of formula VI.

Said polycarbonate may have a molecular weight (MW) of at least 20,000, preferably at least 25,000. The molecular weight may be less than 100,000, for example less than 50,000 or less than 40,000.

Said polycarbonate may have a melt volume-flow rate (MVR) (300° C./1.2 kg) in accordance with ISO1133 of at least 3 cm$^3$/10 mins, preferably at least 5 cm$^3$/10 mins. The MVR may be less than 10 cm$^3$/10 mins, for example less than 8 cm$^3$/10 mins.

Said polycarbonate may have a Tg (10° C./min) in accordance with ISO11357-1/-2 of at least 130° C., for example at least 140° C. The Tg may be less than 165° C.

Said polycarbonate may have a Vicat Softening temperature (50° C./h, 50N) in accordance with 180306 of at least 135° C. for example at least 145° C. The Vicat Softening temperature may be less than 180° C. or less than 160° C.

When said polymeric additive is a polymeric material (B) as described in (ii)(b), said polymeric additive may have a Tg of less than 0° C., preferably less than minus 20° C. for example less than minus 40° C.

Said polymeric material (B) as described in (ii)(b) may have a softening point of greater than 100° C. The softening point may be less than 160° C.

Said polymeric material (B) may have an elongation at break of greater than 450%.

Said polymeric material (B) may have a tensile strength of greater than 9000 KPa.

In said repeat unit of general formula III of said polymeric material (B), $R^1$ and $R^2$ may be independently selected from a hydrogen atom and a $C_{1-4}$, preferably a $C_{1-2}$, non-substituted alkyl moiety. Preferably, $R^1$ and $R^2$ both represent a hydrogen atom.

Suitably, $R^3$ and $R^4$ independently represent a hydrogen atom, a non-substituted $C_{1-10}$ alkyl group, an alkyloxycarbonyl-containing moiety (e.g. a $C_{1-4}$ alkyloxycarbonyl-containing moiety) or an anhydride-containing moiety (e.g. a cyclic anhydride containing moiety).

Suitably, $R^3$ represents a hydrogen atom or a $C_{1-4}$ alkyl group which is preferably non-substituted.

Suitably, $R^4$ represents a $C_{1-10}$ alkyl group or an alkyloxycarbonyl-containing moiety. When it is an alkyloxycarbonyl-containing moiety, said carbonyl moiety is preferably directly covalently bonded to the carbon atom in moiety —CR$^3$R$^4$— in formula III. When it is an alkyloxycarbonyl-containing moiety, said moiety may be of formula

VII where the starred carbon atom represents the atom covalently bonded to the carbon atom in moiety —CR$^3$R$^4$—.

$R^6$ may represent a $C_{1-10}$ alkyl moiety (especially a non-substituted moiety), preferably a $C_{1-6}$ alkyl moiety (especially a non-substituted moiety), more preferably a $C_{1-4}$ alkyl moiety (especially a non-substituted moiety).

In one embodiment, $R^6$ may represent a butyl group; in another, it may represent a methyl group.

When $R^4$ is an alkyloxycarbonyl-containing moiety, for example of formula VII as described, said polymeric material (B) may be an acrylate core-shell type polymer. It may include a core which comprises a polyalkylacrylate. Suitably, the alkyl moiety in said polyalkylacrylate is a $C_{1-6}$, for example a $C_{2-5}$, especially a $C_{3-4}$ non-substituted alkyl moiety. The core may comprise a polybutylacrylate. The core may include a repeat unit of the following formula (before any cross-linking of the repeat unit)

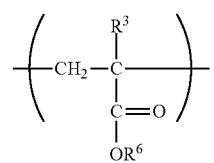

VIII suitably wherein $R^6$ is as described, but is preferably a non-substituted butyl group, and $R^3$ may be as described but is preferably a hydrogen atom.

When said polymeric material (B) is a core-shell type polymer, the core may be as described and the shell may be of formula VIII wherein, preferably, $R^6$ represents a $C_{1-4}$, more preferably, a $C_{1-2}$ non-substituted alkyl moiety and $R^3$ represents a hydrogen atom or a $C_{1-2}$, especially a methyl, group.

Said polymeric material (B) may include 70 to 90 wt % (preferably 76 to 84 wt %) of said core and 10 to 30 wt % (preferably 16 to 24 wt %) of said shell.

In an embodiment (I), polymeric material (B) may comprise a core-shell polymer wherein the core comprises an alkyl acrylate (especially butyl acrylate) and the shell comprises an alkylacrylate (especially polymethylmethacrylate).

In an embodiment (II), $R^4$ may represent an anhydride-containing moiety. The anhydride-containing moiety may be a cyclic anhydride, for example a part of a 5- or 6-membered ring. It preferably comprises a maleic anhydride moiety.

In an embodiment (III), said polymeric material (B) may comprise a copolymer which may include a first repeat unit of general formula III and a second repeat unit of general formula III.

Said first repeat unit of general formula III may include a group $R^4$ which represents an anhydride-containing moiety. The anhydride-containing moiety may be a cyclic anhydride, for example part of a 5- or 6-membered ring. $R^4$ preferably comprises a maleic anhydride moiety. The anhydride moiety may be directly covalently bonded to the carbon atom which is starred in the following moiety —C*R$^3$R$^4$—.

In said first repeat unit, $R^1$, $R^2$ and $R^3$ may be as described herein. Preferably, they are independently selected from a hydrogen atom and a $C_{1-4}$, especially a $C_{1-2}$ non-substituted alkyl group. Preferably, in said first repeat unit $R^1$, $R^2$ and $R^3$ represent hydrogen atoms.

In said second repeat unit, of general formula III of said embodiment (III), $R^4$ may comprise an optionally-substituted, preferably unsubstituted, $C_{2-14}$ (e.g. $C_{2-8}$) alkyl, alkenyl or alkylyl group. Preferably, $R^4$ represents a non-substituted $C_{2-12}$, (e.g. $C_{2-8}$) alkyl group. More preferably, $R^4$ represents a non-substituted $C_{3-12}$ (e.g. $C_{4-6}$) alkyl group. Preferred alkyl groups are linear. In an especially preferred embodiment, $R^4$ represents a $C_{5-7}$, especially a $C_6$ alkyl group.

In said second repeat unit, $R^1$, $R^2$ and $R^3$ may be as described herein. Preferably, they are independently selected from a hydrogen atom and a $C_{1-4}$, especially a $C_{1-2}$ non-substituted alkyl group. Preferably, in said first repeat unit, $R^1$, $R^2$ and $R^3$ represent hydrogen atoms.

In said embodiment (III), said first repeat unit may comprise:

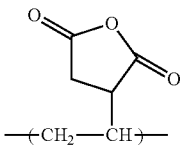

In said embodiment (III), aid second repeat unit may comprise:

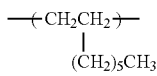

In said composition, the ratio of the wt % of said polymeric material (A) divided by the wt % of all polymeric materials in said composition is preferably at least 0.75, preferably at least 0.82, more preferably at least 0.87. Said ratio may be less than 0.98 or less than 0.94.

In said composition, the ratio of the wt % of said polymeric material (A) divided by the sum of the wt % of said polymeric material (A) and said polymeric additive is preferably at least 0.75, preferably at least 0.82, more preferably at least 0.87. Said ratio may be less than 0.98 or less than 0.94.

In some embodiments in said composition, the sum of the wt % of said polymeric material (A) and said polymeric additive preferably represents at least 90 wt %, more preferably at least 95 wt %, especially at least 99 wt % of said composition. Thus, said composition may consist essentially of polymeric material (A) and said polymeric additive. In some preferred embodiments said composition may consist of polymeric material (A) and said polymeric additive.

Said composition preferably includes a polycarbonate as described in (ii)(a) or a polymeric material (B) as described in (ii)(b). Preferably, said composition does not include both a polycarbonate as described in (ii)(a) and a polymeric material (B) as described in (ii)(b). Preferably said polymeric additive consists of polymeric material (B) as described in (ii)(b).

Said composition preferably includes only two thermoplastic materials—said polymeric material (A) and one compound selected from said polycarbonate and said polymeric material (B). For the avoidance of doubt, said polymeric material (B) may be a core-shell polymer as described.

Said composition preferably includes said polymeric material (B). An especially preferred polymeric material (B) is said polymeric material (B) of said embodiment (III).

Said composition may have a crystallinity measured as described in Example 19 of at least 20%, preferably at least 22%, more preferably at least 24%. The crystallinity may be less than 30%.

Said composition may have a tensile strength, measured in accordance with ISO527, of at least 65 MPa, preferably at least 70 MPa. The tensile strength is preferably in the range 70-90 MPa.

Said composition may have a flexural strength, measured in accordance with ISO178, of at least 110 MPa. The flexural strength is preferably in the range 115-145 MPa, more preferably in the range 115-140 MPa.

Said composition may have a flexural modulus, measured in accordance with ISO178, of at least 2 GPa, preferably at least 2.5 GPa. The flexural modulus is preferably in the range 2.5-4 GPa Said composition suitably has a melt viscosity, measured as described in Example 16, of less than 225 Pa·s, preferably less than 205 Pa·s, more preferably less than 190 Pa·s, even more preferably less than 185 Pa·s.

The difference between the MV of said composition and said polymeric material (A) is preferably at least 30 Pa·s.

The crystallinity of said composition minus the crystallinity of said polymeric material (A) is suitably greater than minus 3, preferably greater than minus 2.

Advantageously, said composition is found to be lighter (i.e. has a higher L*, measured as described in Example 17. Thus, said composition may have an L* when measured as aforesaid of at least 75, preferably at least 80. The ratio of the L* of said composition divided by the L* of said polymeric material (A) is preferably at least 1.05, more preferably at least 1.10, especially at least 1.12.

Said composition preferably comprises an intimate blend of said polymeric material (A) and said polymeric additive. Such a blend may be prepared by melt-processing, for example by extrusion.

Said composition may be provided in the form of pellets or granules. Said pellets or granules suitably comprise at least 90 wt %, preferably at least 95 wt %, especially at least 99 wt % of said composition. Pellets or granules may have a maximum dimension of less than 10 mm, preferably less than 7.5 mm, more preferably less than 5.0 mm.

In one embodiment, said composition may be part of a composite material which may include said composition and a filler. Said filler may include a fibrous filler or a non-fibrous filler. Said filler may include both a fibrous filler and a non-fibrous filler. A said fibrous filler may be continuous or discontinuous.

A said fibrous filler may be selected from inorganic fibrous materials, non-melting and high-melting organic fibrous materials, such as aramid fibres, and carbon fibre.

A said fibrous filler may be selected from glass fibre, carbon fibre, asbestos fibre, silica fibre, alumina fibre, zirconia fibre, boron nitride fibre, silicon nitride fibre, boron fibre, fluorocarbon resin fibre and potassium titanate fibre. Preferred fibrous fillers are glass fibre and carbon fibre.

A fibrous filler may comprise nanofibers.

A said non-fibrous filler may be selected from mica, silica, talc, alumina, kaolin, calcium sulfate, calcium carbonate, titanium oxide, ferrite, clay, glass powder, zinc oxide, nickel carbonate, iron oxide, quartz powder, magnesium carbonate, fluorocarbon resin, graphite, carbon powder, nanotubes and barium sulfate. The non-fibrous fillers may be introduced in the form of powder or flaky particles.

Preferably, said filler comprises one or more fillers selected from glass fibre, carbon fibre, aramid fibres, carbon black and a fluorocarbon resin. More preferably, said filler comprises glass fibre or carbon fibre. Such filler preferably comprises glass fibre.

A composite material as described may include at least 40 wt %, or at least 50 wt % of filler. Said composite material may include 70 wt % or less or 60 wt % or less of filler.

In some embodiments said composition may preferably further comprise one or more antioxidants, such as a phenolic antioxidant (e.g. Octadecyl-3-(3,5-di-tert.butyl-4-hydroxyphenyl)-propionate), an organic phosphite antioxidant (e.g. tris(2,4-di-tert-butylphenyl)phosphite) and/or a secondary aromatic amine antioxidant. In some preferred embodiments said composition may comprise polymeric material (A), said polymeric additive (preferably polymeric material (B) as described in (ii)(b)) and one or more antioxidant. In some preferred embodiments said composition may consist of polymeric material (A), said polymeric additive (preferably polymeric material (B) as described in (ii)(b)) and one or more antioxidant.

In some embodiments, said composition may be part of a composite material which may include said composition and one or more of stabilizers such as light stabilizers and heat stabilizers, processing aids, pigments, UV absorbers, lubricants, plasticizers, flow modifiers, flame retardants, dyes, colourants, anti-static agents, extenders, metal deactivators, conductivity additives such as carbon black and carbon nanofibrils.

According to a second aspect of the invention, there is provided a method of making a composition according to the first aspect, the method comprising:
(a) selecting a polymeric material (A) according to the first aspect;
(b) selecting a polymeric additive according to the first aspect;
(c) melt-processing the polymeric material (A) and polymeric additive in a melt-processing apparatus, thereby to produce said composition wherein, suitably, said polymeric material (A) and said polymeric additive are intimately mixed.

In the process, the polymeric additive is preferably not subjected to a temperature which is greater than 330° C. Preferably, the temperature of said polymeric additive does not exceed 330° C. in the process.

Said polymeric material (A) selected in step (a) preferably has a crystallinity, or is crystallisable to have a crystallinity, of at least 20%, preferably at least 23%.

The invention of the second aspect extends to a method of making a composition as described which has an increased L* compared to the L* of said polymeric material (A), suitably when L* is assessed as described hereinafter. The invention suitably comprises step (a), (b) and (c) as described. The L* may be increased by at least 7 or at least 10 units. The method may comprise making a composition as described which has an L* of at least 75, preferably at least 80.

The invention extends to a method of making a composition which comprises the polymeric material (A) according to the first aspect and which has an MV, measured as described in Example 16, of less than 225 Pa·s, preferably less than 205 Pa·s, more preferably less than 190 Pa·s, wherein the method comprises steps (a), (b) and (c) of said second aspect.

The method may further comprise achieving said MV as described together with the crystallinity of said composition being at least 20%, preferably at least 22%, more preferably at least 24%.

In the method of the second aspect, pellets or granules as described in the first aspect may be prepared.

The invention extends, in a third aspect, to a pack comprising a composition and/or pellets or granules as described in the first aspect or made in the method of the second aspect.

Said pack may include at least 1 kg, suitably at least 5 kg, preferably at least 10 kg, more preferably at least 14 kg of material of said composition. Said pack may include 1000 kg or less, preferably 500 kg or less of said composition. Preferred packs include 10 to 500 kg of said composition.

Said composition in said pack may be in powder or granular form.

Said pack may comprise packaging material (which is intended to be discarded or re-used) and a desired material (which suitably comprises said composition). Said packaging material preferably substantially fully encloses said desired material. Said packaging material may comprise a first receptacle, for example a flexible receptacle such as a plastics bag in which said desired material is arranged. The first receptacle may be contained within a second receptacle for example in a box such as a cardboard box.

The invention extends, in a fourth aspect, to a component which comprises, preferably consists essentially of, a composition according to the first aspect or made in a method described. Said component may be an injection moulded component or an extruded component.

The invention extends, in a fifth aspect, to a method of making a component as described which comprises selecting a composition according to the first aspect and melt-processing, for example by injection moulding or extrusion, said composition to define the component. The component may be as described in the fourth aspect.

According to a sixth aspect of the invention, there is provided a composition comprising:
(i) a polymeric material (A) having a repeat unit of formula

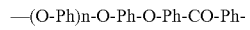

—(O-Ph)n-O-Ph-O-Ph-CO-Ph—    I and a repeat unit of formula

—O-Ph-Ph-O-Ph-CO-Ph—    II wherein Ph represents a phenylene moiety and n represents 0 or 1; and
(ii) a polymeric additive comprising one or more of:
(a) a polycarbonate; and/or
(b) a polymeric material (8) which includes a repeat unit of general formula

—(CR$^1$R$^2$—CR$^3$R$^4$)—    III wherein R$^1$ and R$^2$ independently represent a hydrogen atom or an optionally-substituted (preferably un-substituted) alkyl group, and R$^3$ and R$^4$ independently represent a hydrogen atom or an optionally-substituted alkyl group, an anhydride-containing moiety or an alkyloxycarbonyl-containing moiety.

According to a seventh aspect of the invention, there is provided a composition comprising:
(i) a polymeric material (A) having a repeat unit of formula

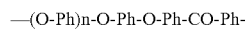

—(O-Ph)n-O-Ph-O-Ph-CO-Ph—    I and a repeat unit of formula

—O-Ph-Ph-O-Ph-CO-Ph—    II wherein Ph represents a phenylene moiety and n represents 0 or 1; and
(ii) a silicon-containing polymeric material.

A composition as described is found, surprisingly, to have significantly higher tensile elongation and Notched Izod Impact Strength properties compared to virgin polymeric material (A) and the other samples tested in this application.

Said composition may have any feature of the composition of the first aspect. For example, polymeric material (A) of the seventh aspect may have any feature of polymeric material (A) of the first aspect.

Preferably the silicon-containing polymeric material comprises a silicon-containing graft copolymer. Preferably the silicon-containing graft copolymer is a core-shell type copolymer. In the context of the present invention a core-shell type polymer or copolymer is configured of innermost layers (the core) and one or more layers (the shell) that cover the core. The core-shell type copolymer is generally obtained by graft-copolymerising, as the shell, a copolymerisable monomer component with a polymeric component of the core.

Preferably the silicon-containing graft copolymer comprises a polyorganosiloxane component. Said polyorganosiloxane component may advantageously comprise a polyorganosiloxane rubber.

The polyorganosiloxane component may be prepared by reacting an organosiloxane and a multifunctional crosslinker in an emulsion polymerization process. It is also possible to insert graft-active sites into the silicon-containing polymeric material by the addition of suitable unsaturated organosiloxanes. The organosiloxane is generally cyclic, the ring structures preferably containing from 3 to 6 Si atoms. Examples include hexamethylcyclotrisiloxane, octamethylcyclotetrasiloxane, decamethylcyclopentasiloxane, dodecamethylcyclo-hexasiloxane, trimethyltriphenylcylotrisiloxane, tetramethyltetraphenylcycotetrasiloxane, octaphenylcyclotetrasiloxane, which may be used alone or in a mixture of two or more such compounds. The organosiloxane component may be present in the silicon-containing polymeric material in an amount of at least 70 wt %, preferably at least 75 wt %, based on the weight of the silicon-containing polymeric material.

Suitable crosslinking agents are tri- or tetra-functional silane compounds. Preferred examples include trimethoxymethylsilane, triethoxyphenylsilane, tetramethoxysilane, tetraethoxysilane, tetra-n-propoxysilane, tetrabutoxysilane.

Preferably said core of the silicon-containing graft copolymer comprises the polyorganosiloxane component. Said core preferably further comprises one or more of polybutadiene, polyisoprene, poly(alkyl acrylate)s such as poly(butyl acrylate), poly(2-ethylhexyl acrylate), and butyl acrylate/2-ethylhexyl acrylate copolymers, butadiene/acrylic composites, styrene/butadiene copolymers, ethylene/α-olefin copolymers such as ethylene/propylene copolymers, ethylene/butene copolymers, and ethylene/octene copolymers, ethylene/acrylic copolymers, and/or fluororubbers.

In some preferred embodiments said core alternatively or additionally comprises IPN (interpenetrating polymer network) type composite rubbers. Preferably said composite type rubbers comprise a polyorganosiloxane rubber and a poly(alkyl acrylate) rubber.

Preferably said shell of the silicon-containing graft copolymer comprises one or more polymeric component formed via the graft copolymerisation of a polymeric component of the core of the silicon-containing graft copolymer with one or more compounds. Preferably said shell of the silicon-containing graft copolymer comprises one or more of polymerised aromatic vinyl compounds, polymerised vinyl cyanide compounds, polymerised (meth)acrylic ester compounds, polymerised (meth)acrylic acid compounds, and polymerised epoxy-group-containing (meth)acrylic ester compounds such as glycidyl(meth)acrylate; polymerised maleimide compounds such as maleimide, N-methylmaleimide, and N-phenylmaleimide; and/or polymerised α/β-unsaturated carboxylic acid compounds, such as maleic acid, fumaric acid, and itaconic acid, and anhydrides thereof (e.g., maleic anhydride). More preferably said shell of the silicon-containing graft copolymer comprises one or more of polymerised aromatic vinyl compounds, polymerised vinyl cyanide compounds, polymerised (meth)acrylic ester compounds, and polymerised (meth)acrylic acid compounds. Most preferred are polymerised (meth)acrylic ester compounds. Examples of the (meth)acrylic ester compounds include methyl(meth)acrylate, ethyl(meth)acrylate, butyl (meth)acylate, cyclohexyl(meth)acrylate, and octyl(meth) acrylate. Preferred of these are methyl(meth)acrylate and ethyl(meth)acrylate and most preferred is methyl(meth) acrylate. The term "(meth)acrylic" or "(meth)acrylate" as used herein inclusively means "acrylic" and "methacrylic" or inclusively means "acrylate" and "methacrylate".

In some embodiments, preferably the composition comprises at least 0.5 wt % said silicon-containing polymeric material, more preferably at least 1 wt % said silicon-containing polymeric material, even more preferably at least 5 wt % said silicon-containing polymeric material, even more preferably at least 10 wt % said silicon-containing polymeric material, even more preferably at least 15 wt % said silicon-containing polymeric material, most preferably at least 20 wt % said silicon-containing polymeric material, based on the total weight of the composition. Preferably the composition comprises at most 40 wt % said silicon-containing polymeric material, more preferably at most 30 wt % said silicon-containing polymeric material, even more preferably at most 25 wt % said silicon-containing polymeric material, most preferably at most 20 wt % said silicon-containing polymeric material, based on the total weight of the composition. These preferred values enable further improvements in the lightness and mechanical properties of the composition.

Specific embodiments of the invention will now be described, by way of example.

The following materials are referred to hereinafter:

Compound B—refers to Paraloid EXL3361 (Trade Mark) methyl methacrylate-butadiene-styrene (MBS) core-shell copolymer obtained from Dow Chemicals.

Compound C—refers to Paraloid EXL3808 (Trade Mark) maleic anhydride functionalised ethylene octane copolymer obtained from Dow Chemicals.

Compound D—refers to Makrolon 3108 (Trade Mark) polycarbonate obtained from Bayer.

Compound E—refers to a PPSU, namely Ultrason P3010 (Trade Mark) obtained from BASF.

Compound F—refers to Kane Ace (Trade Mark) MR01 obtained from Kaneka.

Compound G—refers to Kane Ace (Trade Mark) MR02 obtained from Kaneka.

Additive A=Process and thermal stabiliser, Irgafos 168 (Trade Mark) (obtained from BASF).

Additive B=Process and thermal stabiliser, Irganox 1076 (Trade Mark) (obtained from BASF).

In the following description, Example 1 describes preparation of a copolymer. Examples 2 to 14 describe the preparation of compositions for testing optionally including the copolymer and Example 15 describes the injection moulding of such compositions. Examples 16 to 19 describe assessments undertaken on the compositions and/or parts made therefrom.

EXAMPLE 1

Preparation of Polyetheretherketone (PEEK)-Polyetherdiphenyletherketone (PEDEK) Copolymer A 300 liter vessel fitted with a lid, stirrer/stirrer guide, nitrogen inlet and outlet was charged with diphenylsulphone (125.52 kg) and heated to 150° C. Once fully melted 4,4'-diflurobenzophenone (44.82 kg, 205.4 mol), 1,4-dihydroxybenzene (16.518 kg, 150 mol) and 4,4'-dihydroxydiphenyl (9.311 kg, 50 mol) were charged to the vessel. The contents were then heated to 160° C. While maintaining a nitrogen blanket, dried sodium carbonate (21.368 kg, 201.6 mol) and potassium carbonate (1.106 kg, 8 mol), both sieved through a screen with a mesh of 500 micrometers, were added. The D50 of the sodium carbonate was 98.7 μm. The temperature was raised to 180° C. at 1° C./min and held for 100 minutes. The temperature was raised to 200° C. at 1° C./min and held for 20 minutes. The temperature was raised to 305° C. at 1° C./min and held until desired melt viscosity was reached, as determined by the torque rise of the stirrer. The required torque rise was determined from a calibration graph of torque rise versus MV. The reaction mixture was poured via a band caster into a water bath, allowed to cool, milled and washed with acetone and water. The resulting polymer powder was dried in a tumble dryer until the contents temperature measured 112° C. The MV of the resulting polymer was 225 Pa·s measured according to Example 16 at 340° C. and the crystallinity was 24% measured according to Example 19.

EXAMPLES 2 TO 14

Preparation of Compositions

The raw materials referred to in Tables 1 and 2 were tumble blended and then compounded using a ZSK twin-screw extruder operating with a barrel temperature of 315° C., die temperature of 320° C. and screw speed of 300 rpm. The throughput in each case was 13-14 kg/hour.

EXAMPLE 15

Preparation of Test Bars

Standard type 1A ISO test bars (ISO 3167) were injection moulded using each of the compositions of Examples 2 to 14 on an Arburg injection moulding machine with a barrel temperature of 320° C.-335° C., nozzle temperature of 335'C and a tool temperature of 160° C.

The compositions and/or test bars were assessed as described in Examples 16 to 19.

EXAMPLE 16

Determination of Melt Viscosity (MV) of Polymers

Unless otherwise stated herein, this was measured using a Bohlin Instruments RH2000 capillary rheometer according to ISO 11443 operating at 340° C. and a shear rate of 1000 $s^{-1}$ using a 0.5 mm (capillary diameter)×8.0 mm (capillary length) die with entry angle 180° C.

Granules are loaded into the barrel and left to pre-heat for 10 minutes. The viscosity is measured once steady state conditions are reached and maintained, nominally 5 minutes after the start of the test.

EXAMPLE 17

Colour Measurements

Unless otherwise stated herein, colour measurements were carried out on injection moulded ISO test bars made as described in Example 15. The measurements were made using a Konica Minolta Chromameter with a DP400 data processor operating over a spectral range of 360 nm to 750 nm. A white plate calibration was carried out with a D65 (natural daylight) light source. Colour measurements are expressed at L*, a* and b* coordinates as defined by the CIE 1976 (Nassau, K. Kirk-Othmer Encyclopaedia of Chemical Technology, chapter 7, page 303-341, 2004). Values were determined from a single point on the ISO test bar.

TABLE 1

| Examples No. | 2 | 3 | 4 | 5 | 6 | 7 |
|---|---|---|---|---|---|---|
| PEEK-PEDEK copolymer of Example 1 | 100 wt % | 90 wt % | 90 wt % | 90 wt % | 90 wt % | 70 wt % |
| Compound B | — | 5 wt % | — | — | — | — |
| Compound C | — | — | 5 wt % | 10 wt % | — | — |
| Compound D | — | 5 wt % | 5 wt % | — | 10 wt % | — |
| Compound E | — | — | — | — | — | 30 wt % |

TABLE 2

| Examples No. | 8 | 9 | 10 | 11 | 12 | 13 | 14 |
|---|---|---|---|---|---|---|---|
| PEEK-PEDEK copolymer of Example 1 | 89 wt % | 89 wt % | 79 wt % | 79 wt % | 90 wt % | 90 wt % | 89 wt % |
| Compound B | — | 10 wt % | 10 wt % | — | | | |
| Compound C | 10 wt % | — | — | 10 wt % | | | |
| Compound D | — | — | 10 wt % | 10 wt % | | | |
| Compound E | — | — | — | — | | | |
| Compound F | | | | | 10 wt % | | |
| Compound G | | | | | | 10 wt % | 10 wt % |
| Additive A | 0.5 wt % | 0.5 wt % | 0.5 wt % | 0.5 wt % | | 0.5 wt % | |
| Additive B | 0.5 wt % | 0.5 wt % | 0.5 wt % | 0.5 wt % | | 0.5 wt % | |

EXAMPLE 18

Mechanical Properties

The mechanical properties of the compositions of Examples 2 to 14 were tested according to ISO standards using the type 1A (ISO 3167) test bars at 23° C.

EXAMPLE 19

Differential Scanning Calorimetry Assessment of Compositions of Examples 2 to 14

Crystallinity described herein may be assessed by several methods for example by density, by IR spectroscopy, by x ray diffraction or by differential scanning calorimetry (DSC). The DSC method has been used to evaluate the crystallinity that developed in the polymers from Examples 1 and 2 using a Mettler Toledo DSC1 Star system with FRS5 sensor.

The Glass Transition Temperature (Tg), the Melting Temperature (Tm) and Heat of Fusions of Melting (ΔHm) for the polymers were determined using the following DSC method.

An 8 mg sample of each polymer composition was removed from each of the moulded test bars by means of a sharp knife. The sample from each test bar was scanned by DSC as follows:

Step 1 Perform and record a preliminary thermal cycle by heating the sample from 30° C. to 400° C. at 20° C./min.
Step 2 Hold for 5 minutes.
Step 3 Cool at 20° C./min to 30° C. and hold for 5 mins.
Step 4 Re-heat from 30° C. to 400° C. at 20° C./min, recording the Tg, Tn, Tm, ΔHn and ΔHm.

Tc is measured on the cooling cycle (Step 3) and is the temperature at which the crystallisation exotherm reaches a minimum.

From the DSC trace resulting from the scan in step 4, the onset of the Tg was obtained as the intersection of the lines drawn along the pre-transition baseline and a line drawn along the greatest slope obtained during the transition. The Tn was the temperature at which the main peak of the cold crystallisation exotherm reaches a maximum. The Tm was the temperature at which the main peak of the melting endotherm reached a maximum.

The Heat of Fusion for melting (ΔHm) was obtained by connecting the two points at which the melting endotherm deviates from the relatively straight baseline. The integrated area under the endotherm as a function of time yields the enthalpy (mJ) of the melting transition: the mass normalised heat of fusion is calculated by dividing the enthalpy by the mass of the specimen (J/g). The level of crystallisation (X (%)) is determined by dividing the Heat of Fusion of the specimen by the Heat of Fusion of a totally crystalline polymer, which for the PEEK-PEDEK copolymer is 130 J/g and for examples 3-6 is 117 J/g and for example 7 is 91 J/g. The additives are amorphous and do not contribute to the crystallisation peak in the DSC trace. The value of 117 J/g is based on a blend containing 10 wt % of additive and 90 wt % of PEEK-PEDEK. Thus, the Heat of Fusion is 90%× 130 J/g=117 J/g. The value of 91 J/g is based on a blend containing 30 wt % of PPSU and 70 wt % of PEEK-PEDEK. Thus, the Heat of Fusion is 70%×130 J/g=91 J/g.

The compositions of Examples 2 to 14 and/or test bars made therefrom were assessed in the tests of Examples 16 to 19. In addition, the time for the test bar to solidify so that it could be injected from the injection moulding machine was assessed and is referred to as the "cooling time" in seconds. Results are provided in Table 3 and 4.

TABLE 3

| | Example assessed | | | | | |
|---|---|---|---|---|---|---|
| Assessment | 2 | 3 | 4 | 5 | 6 | 7 |
| Processing temp, ° C. | 340 | 340 | 335 | 335 | 335 | 340 |
| Cooling time, moulding(s) | 120 | 35 | 35 | 35 | 120 | 90 |
| Colour (L*) | 72.6 | 83.8 | 85.8 | 86.4 | 71.8 | 76.2 |
| Melt Viscosity (Pa · s) | 225 | 180 | 175 | 170 | 170 | 330 |
| Crystallinity (%) | 24 | 23 | 26 | 25 | 26 | 23 |
| Tensile Modulus (GPa) | 3.5 | 3.1 | 3.0 | 2.8 | 2.9 | 3.4 |
| Tensile Strength at yield (MPa) | 92 | 82 | 80 | 71 | 86 | 93 |
| Tensile Strength at break (MPa) | 64 | 60 | 52 | 52 | 65 | 60 |
| Tensile Elongation, % | 5 | 16 | 16 | 16 | 20 | 5 |
| Flexural Modulus (GPa) | 3.4 | 3.0 | 3.0 | 2.7 | 2.9 | 3.4 |
| Flexural Strength (MPa) | 150 | 133 | 129 | 121 | 133 | 148 |
| Notched Izod Impact Strength (KJm$^{-2}$) | 4.2 | 7.7 | 6.0 | 6.5 | 6.5 | 4.1 |

TABLE 4

| | Example assessed | | | | | | |
|---|---|---|---|---|---|---|---|
| Assessment | 8 | 9 | 10 | 11 | 12 | 13 | 14 |
| Processing temp, ° C. | 335 | 335 | 335 | 335 | 335 | 335 | 335 |
| Cooling time, moulding(s) | 35 | 35 | 35 | 35 | 50 | 50 | 50 |
| Colour (L*) | 87.1 | 86.7 | 86.8 | 87.9 | 86.7 | 87.2 | 87.7 |
| Melt Viscosity (Pa · s) | 150 | 100 | 115 | 120 | 168 | 243 | 281 |
| Tensile Modulus (GPa) | 2.7 | 3.0 | 2.7 | 3.0 | 2.7 | 2.8 | 2.6 |
| Tensile Strength at yield (MPa) | 71 | 73 | 70 | 68 | 68 | 68 | 68 |
| Tensile Strength at break (MPa) | 53 | 56 | 58 | 54 | 60 | 59 | 58 |
| Tensile Elongation, % | 15 | 19 | 21 | 18 | 59 | 66 | 68 |
| Flexural Modulus (GPa) | 2.7 | 2.8 | 2.8 | 2.6 | 2.6 | 2.6 | 2.6 |
| Flexural Strength (MPa) | 121 | 129 | 125 | 118 | 111 | 112 | 112 |
| Notched Izod Impact Strength (KJm$^{-2}$) | 8.6 | 13.5 | 12.0 | 12.0 | 63.6 | 65.6 | 60.2 |

The following should be noted from the results in Table 3 and 4:

(a) The melt viscosities of the compositions of Examples 3 to 6 and 8 to 12 are significantly less than for Example 2 which is a comparative example which comprises virgin PEEK-PEDEK copolymer (i.e. without any additive). The melt viscosities of Examples 3 to 6 and 8 to 12 are also significantly less than for Example 7 which is a comparative example which includes PPSU as an additive.

The low melt viscosity of compositions of Examples 3 to 6 and 8 to 12 means they can advantageously be used in producing thin walled parts. They also may be used in producing highly filled parts (e.g. with filler loadings of greater than 40 wt %).

(b) The crystallinity of the compositions of Examples 3 to 6 is advantageously little affected by inclusion of the additives. Consequently, the chemical resistance of the compositions will be comparable to that of the virgin polymer of Example 2. One skilled in the art would expect the crystallinity of the compositions of examples 8-14 to be similar to those of examples 3-6.

(c) The mechanical properties of parts made from the compositions of Examples 3 to 6 and 8 to 14 are still high, despite inclusion of the additives. Indeed, in the cases of the properties of Tensile Elongation and Notched Izod Impact Strength, Examples 3 to 6 and 8 to 14 performed far better than the comparative examples. Examples 12-14 in particular exhibited extremely high Tensile Elongation and Notched Izod Impact Strength values.

(d) The colour of the compositions of Examples 3 to 5 and 8 to 14 is significantly improved compared to the colour of the virgin polymer (Example 2). Advantageously, the compositions may be more aesthetically acceptable compared to use of virgin polymer, since in general white polymers and whiter parts made therefrom are desirable—whiteness implies higher purity and quality. Additionally, it is easier to adjust the colour and/or match (e.g. by addition of colourants) a lighter polymer compared to the light brown/beige colour of the Example 2 polymer or virgin PEEK.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A composition comprising:
   a polymeric material (A) having a repeat unit of formula —(O-Ph)n-O-Ph-O-Ph-CO-Ph-    I and a repeat unit of formula —O-Ph-Ph-O-Ph-CO-Ph-    II wherein Ph represents a phenylene moiety and n represents 0; and
   (ii) a polymeric additive, wherein said polymeric additive is:
      (b) a polymeric material (B) which includes a first and a second repeat unit of general formula

—(CR¹R²—CR³R⁴)—    III wherein R¹ and R² independently represent a hydrogen atom or an optionally-substituted alkyl group, and R³ and R⁴ independently represent a hydrogen atom or an optionally-substituted alkyl group, an anhydride-containing moiety or an alkyloxycarbonyl-containing moiety, wherein said first repeat unit of general formula III comprises:

—(CH₂—CH)—
   (with succinic anhydride group)

and said second repeat unit of general formula III comprises:

—(CH₂CH₂)—
   |
   (CH₂)₅CH₃, and wherein the composition has a notched izod impact strength of at least 6.0 KJm⁻².

2. A composition according to claim 1, wherein said repeat units I and II are in the relative molar proportions I:II of from 65:35 to 95:5.

3. A composition according to claim 1, wherein said repeat unit of formula I has the structure —O—Ph—O—Ph—CO—Ph—    IV and
   said repeat unit of formula II suitably has the structure —O—Ph—Ph—O—Ph—CO—Ph—    V 4. A composition according to claim 3, wherein said polymeric material (A) includes at least 65 mol % of repeat units of formula IV and includes less than 90 mol % of repeat units of formula IV, and wherein said polymeric material (A) includes at least 10 mol % of repeat units of formula V; and less than 36 mol % of repeat units of formula V.

5. A composition according to claim 1, wherein the Tm of said polymeric material (A) is less than 330° C.

6. A composition according to claim 1, wherein said polymeric material (A) has a crystallinity of at least 23%.

7. A composition according to claim 1, wherein said polymeric material (A) has a melt viscosity of at least 170 Pa·s.

8. A composition according to claim 1, wherein said polymeric additive has a softening point of at least 100° C.

9. A composition according to claim 1, wherein said polymeric additive has a decomposition temperature measured by thermogravimetric analysis of less than 400° C.

10. A composition according to claim 1, wherein said composition has a melt viscosity of less than 225 Pa·s.

11. A composition according to claim 1, wherein said composition has an L* of at least 75; and the ratio of the L* of said composition divided by the L* of said polymeric material (A) is at least 1.05.

12. The composition according to claim 1, wherein the composition has a notched izod impact strength of 6.0 to 13.5 KJm⁻².

13. A method of making a composition according to claim 1, the method comprising:
   (a) selecting a polymeric material according to claim 1;
   (b) selecting a polymeric additive according to claim 1;
   (c) melt-processing the polymeric material and polymeric additive in a melt-processing apparatus, thereby to produce said composition wherein, suitably, said polymeric material (A) and said polymeric additive are intimately mixed.

14. A method according to claim 13, wherein the polymeric additive is not subjected to a temperature which is greater than 330° C. in the process.

15. A method according to claim 13, which comprises making a composition which has an increased L* compared to the L* of said polymeric material (A), and/or making a composition which has an L* of at least 75.

* * * * *